United States Patent
Godsey

(10) Patent No.: US 10,395,307 B2
(45) Date of Patent: *Aug. 27, 2019

(54) MOBILE APPLICATION TO CONDUCT AN AUCTION BASED ON PHYSICAL PRESENCE

(71) Applicant: eBay Inc., San Jose, CA (US)

(72) Inventor: Sandra Lynn Godsey, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/688,226

(22) Filed: Aug. 28, 2017

(65) Prior Publication Data
US 2017/0358026 A1 Dec. 14, 2017

Related U.S. Application Data

(63) Continuation of application No. 13/324,834, filed on Dec. 13, 2011, now Pat. No. 9,779,450.

(51) Int. Cl.
| G06Q 30/00 | (2012.01) |
| G06F 17/30 | (2006.01) |
| G06Q 30/08 | (2012.01) |
| G06Q 10/00 | (2012.01) |

(52) U.S. Cl.
CPC ............. *G06Q 30/08* (2013.01); *G06Q 10/00* (2013.01)

(58) Field of Classification Search
CPC ..................................................... G06Q 30/08
See application file for complete search history.

(56) References Cited

U.S. PATENT DOCUMENTS

| 5,559,707 A | 9/1996 | Delorme et al. |
| 5,649,114 A | 7/1997 | Deaton et al. |
| 5,724,521 A | 3/1998 | Dedrick |
| 5,724,660 A | 3/1998 | Kauser et al. |

(Continued)

FOREIGN PATENT DOCUMENTS

| WO | WO-0122326 A1 | 3/2001 |
| WO | WO-03075193 A1 | 9/2003 |

OTHER PUBLICATIONS

Du Preez, A. G., Ellenport, J. S., & Comas, B. J. (1007). System and method for conducting online auctions Retrieved from https://search.proquest.com/docview/753696990?accountid=14753.*

(Continued)

*Primary Examiner* — Kathleen Palavecino
(74) *Attorney, Agent, or Firm* — Schwegman, Lundberg & Woessner, P.A.

(57) ABSTRACT

A mobile application to conduct an auction based on physical presence is provided. The mobile application may be provided by a system comprising one or more modules. A notification module may identify an item to be sold at an auction. If a pre-auction window time period has arrived, the notification module may transmit auction notification messages to a plurality of client devices located within a predefined geographical area. A bidding module may conduct the auction by providing an auction interface to the client devices within the predefined geographical area. The auction interface includes an option to bid on the item. A completion module may transmit a confirmation to a winning auction participant.

20 Claims, 8 Drawing Sheets

(56) References Cited

U.S. PATENT DOCUMENTS

| | | |
|---|---|---|
| 5,732,354 A | 3/1998 | Macdonald |
| 5,848,373 A | 12/1998 | DeLorme et al. |
| 5,890,068 A | 3/1999 | Fattouche et al. |
| 5,938,721 A | 8/1999 | Dussell et al. |
| 5,946,687 A | 8/1999 | Gehani et al. |
| 5,948,040 A | 9/1999 | DeLorme et al. |
| 6,014,090 A | 1/2000 | Rosen et al. |
| 6,069,570 A | 5/2000 | Herring et al. |
| 6,091,956 A | 7/2000 | Hollenberg |
| 6,097,958 A | 8/2000 | Bergen |
| 6,122,520 A | 9/2000 | Want et al. |
| 6,154,172 A | 11/2000 | Piccionelli et al. |
| 6,157,841 A | 12/2000 | Bolduc et al. |
| 6,167,274 A | 12/2000 | Smith |
| 6,198,927 B1 | 3/2001 | Wright et al. |
| 6,204,812 B1 | 3/2001 | Fattouche |
| 6,208,297 B1 | 3/2001 | Fattouche et al. |
| 6,208,857 B1 | 3/2001 | Agre et al. |
| 6,243,588 B1 | 6/2001 | Koorapaty et al. |
| 6,246,861 B1 | 6/2001 | Messier et al. |
| 6,246,882 B1 | 6/2001 | Lachance |
| 6,259,381 B1 | 7/2001 | Small |
| 6,259,923 B1 | 7/2001 | Lim et al. |
| 6,266,014 B1 | 7/2001 | Fattouche et al. |
| 6,269,361 B1 | 7/2001 | Davis et al. |
| 6,314,365 B1 | 11/2001 | Smith |
| 6,317,684 B1 | 11/2001 | Roeseler et al. |
| 6,321,158 B1 | 11/2001 | Delorme et al. |
| 6,330,452 B1 | 12/2001 | Fattouche et al. |
| 6,341,255 B1 | 1/2002 | Lapidot |
| 6,347,230 B2 | 2/2002 | Koshima et al. |
| 6,356,543 B2 | 3/2002 | Hall et al. |
| 6,357,042 B2 | 3/2002 | Srinivasan et al. |
| 6,374,176 B1 | 4/2002 | Schmier et al. |
| 6,374,177 B1 | 4/2002 | Lee et al. |
| 6,404,388 B1 | 6/2002 | Sollenberger et al. |
| 6,424,840 B1 | 7/2002 | Fitch et al. |
| 6,442,529 B1 | 8/2002 | Krishan et al. |
| 6,456,852 B2 | 9/2002 | Bar et al. |
| 6,477,363 B1 | 11/2002 | Ayoub et al. |
| 6,496,857 B1 | 12/2002 | Dustin et al. |
| 6,519,463 B2 | 2/2003 | Tendler |
| 6,529,159 B1 | 3/2003 | Fan et al. |
| 6,552,682 B1 | 4/2003 | Fan |
| 6,563,459 B2 | 5/2003 | Takenaga |
| 6,577,946 B2 | 6/2003 | Myr |
| 6,580,914 B1 | 6/2003 | Smith |
| 6,590,529 B2 | 7/2003 | Schwoegler |
| 6,590,533 B2 | 7/2003 | Sollenberger et al. |
| 6,618,593 B1 | 9/2003 | Drutman et al. |
| 6,664,922 B1 | 12/2003 | Fan |
| 6,690,322 B2 | 2/2004 | Shamoto et al. |
| 6,714,797 B1 | 3/2004 | Rautila |
| 6,718,551 B1 | 4/2004 | Swix et al. |
| 6,732,120 B1 | 5/2004 | Du |
| 6,741,188 B1 | 5/2004 | Miller et al. |
| 6,741,969 B1 * | 5/2004 | Chen ............ G06Q 10/02 705/1.1 |
| 6,757,544 B2 | 6/2004 | Rangarajan et al. |
| 6,807,479 B2 | 10/2004 | Watanabe et al. |
| 6,819,919 B1 | 11/2004 | Tanaka |
| 7,082,365 B2 | 7/2006 | Sheha et al. |
| 7,092,702 B2 | 8/2006 | Cronin et al. |
| 7,130,622 B2 | 10/2006 | Vänskä et al. |
| 7,138,913 B2 | 11/2006 | Mackenzie et al. |
| 7,142,858 B2 | 11/2006 | Aoki et al. |
| 7,164,986 B2 | 1/2007 | Humphries et al. |
| 7,196,639 B2 | 3/2007 | Joyce et al. |
| 7,197,719 B2 | 3/2007 | Doyle et al. |
| 7,199,815 B2 | 4/2007 | Aoyama |
| 7,203,502 B2 | 4/2007 | Wilson et al. |
| 7,203,598 B1 | 4/2007 | Whitsell |
| 7,213,214 B2 | 5/2007 | Baar et al. |
| 7,216,109 B1 | 5/2007 | Donner |
| 7,246,109 B1 | 7/2007 | Ramaswamy |
| 7,254,388 B2 | 8/2007 | Nam et al. |
| 7,273,172 B2 | 9/2007 | Olsen, III et al. |
| 7,385,499 B2 | 6/2008 | Horton et al. |
| 7,389,919 B2 | 6/2008 | Walker et al. |
| 7,502,133 B2 | 3/2009 | Fukunaga et al. |
| 7,532,899 B2 | 5/2009 | Wilson et al. |
| 7,657,436 B2 | 2/2010 | Elmore et al. |
| 7,668,931 B2 | 2/2010 | Parupudi et al. |
| 7,669,759 B1 | 3/2010 | Zettner |
| 7,706,740 B2 | 4/2010 | Collins et al. |
| 7,715,981 B2 | 5/2010 | Bradley et al. |
| 7,720,436 B2 | 5/2010 | Hamynen et al. |
| 7,720,844 B2 | 5/2010 | Chu et al. |
| 7,747,259 B2 | 6/2010 | Pande et al. |
| 7,751,971 B2 | 7/2010 | Chang et al. |
| 7,761,340 B2 | 7/2010 | Yee et al. |
| 7,848,765 B2 | 12/2010 | Phillips et al. |
| 7,909,326 B2 | 3/2011 | Walker et al. |
| 8,041,604 B1 | 10/2011 | Glaser |
| 8,095,428 B2 | 1/2012 | Penagulur et al. |
| 8,098,894 B2 | 1/2012 | Soderstrom |
| 8,099,109 B2 | 1/2012 | Altman et al. |
| 8,249,884 B2 | 8/2012 | Turner et al. |
| 8,326,315 B2 | 12/2012 | Phillips et al. |
| 8,355,948 B2 | 1/2013 | Mason |
| 8,371,502 B1 | 2/2013 | Galit et al. |
| 8,442,871 B2 | 5/2013 | Veres et al. |
| 8,463,295 B1 | 6/2013 | Caralis et al. |
| 8,650,072 B2 | 2/2014 | Mason et al. |
| 8,811,957 B2 | 8/2014 | Jovicic et al. |
| 8,868,443 B2 | 10/2014 | Yankovich et al. |
| 8,909,248 B2 | 12/2014 | Phillips et al. |
| 9,779,450 B2 | 10/2017 | Godsey et al. |
| 2001/0055976 A1 | 12/2001 | Couch et al. |
| 2002/0046259 A1 | 4/2002 | Glorikian |
| 2002/0065689 A1 | 5/2002 | Bingham et al. |
| 2002/0078444 A1 | 6/2002 | Krewin et al. |
| 2002/0082941 A1 | 6/2002 | Bird |
| 2002/0102967 A1 | 8/2002 | Chang et al. |
| 2002/0111154 A1 | 8/2002 | Eldering et al. |
| 2002/0115453 A1 | 8/2002 | Poulin et al. |
| 2002/0143930 A1 | 10/2002 | Babu et al. |
| 2002/0145984 A1 | 10/2002 | Babu et al. |
| 2002/0155844 A1 | 10/2002 | Rankin et al. |
| 2002/0160766 A1 | 10/2002 | Portman et al. |
| 2002/0198003 A1 | 12/2002 | Klapman |
| 2003/0004802 A1 | 1/2003 | Callegari |
| 2003/0007006 A1 | 1/2003 | Baar et al. |
| 2003/0037041 A1 | 2/2003 | Hertz |
| 2003/0040324 A1 | 2/2003 | Eldering et al. |
| 2003/0065805 A1 | 4/2003 | Barnes, Jr. |
| 2003/0125043 A1 | 7/2003 | Silvester et al. |
| 2003/0126150 A1 | 7/2003 | Chan et al. |
| 2003/0130787 A1 | 7/2003 | Clapper |
| 2003/0139190 A1 | 7/2003 | Steelberg et al. |
| 2003/0216960 A1 | 11/2003 | Postrel |
| 2003/0220835 A1 | 11/2003 | Barnes, Jr. |
| 2004/0002359 A1 | 1/2004 | Deas et al. |
| 2004/0021567 A1 | 2/2004 | Dunn |
| 2004/0023666 A1 | 2/2004 | Moon et al. |
| 2004/0039579 A1 | 2/2004 | Chithambaram et al. |
| 2004/0043773 A1 | 3/2004 | Lee et al. |
| 2004/0111332 A1 | 6/2004 | Baar et al. |
| 2004/0139330 A1 | 7/2004 | Baar |
| 2004/0192339 A1 | 9/2004 | Wilson et al. |
| 2004/0192349 A1 | 9/2004 | Reilly |
| 2004/0203901 A1 | 10/2004 | Wilson et al. |
| 2004/0203931 A1 | 10/2004 | Karaoguz |
| 2004/0220821 A1 * | 11/2004 | Ericsson ............ G06Q 30/0601 705/37 |
| 2005/0015300 A1 | 1/2005 | Smith et al. |
| 2005/0044032 A1 | 2/2005 | Lee et al. |
| 2005/0064852 A1 | 3/2005 | Baldursson |
| 2005/0065916 A1 | 3/2005 | Ge et al. |
| 2005/0159883 A1 | 7/2005 | Humphries |
| 2005/0240512 A1 | 10/2005 | Quintero et al. |
| 2005/0250516 A1 | 11/2005 | Shim |
| 2005/0278749 A1 | 12/2005 | Ewer et al. |

(56) References Cited

U.S. PATENT DOCUMENTS

| | | |
|---|---|---|
| 2006/0004646 A1* | 1/2006 | Schoen .............. G06Q 30/0275 705/37 |
| 2006/0047825 A1 | 3/2006 | Steenstra et al. |
| 2006/0064346 A1 | 3/2006 | Steenstra et al. |
| 2006/0089792 A1 | 4/2006 | Manber et al. |
| 2006/0098028 A1 | 5/2006 | Baar |
| 2006/0099959 A1 | 5/2006 | Staton et al. |
| 2006/0145837 A1 | 7/2006 | Horton et al. |
| 2006/0148488 A1 | 7/2006 | Syrbe |
| 2006/0218114 A1 | 9/2006 | Weare et al. |
| 2006/0236257 A1 | 10/2006 | Othmer et al. |
| 2006/0270421 A1 | 11/2006 | Phillips et al. |
| 2006/0271281 A1 | 11/2006 | Ahn et al. |
| 2007/0015517 A1 | 1/2007 | Casey |
| 2007/0024469 A1 | 2/2007 | Chou |
| 2007/0083437 A1 | 4/2007 | Hamor |
| 2007/0100740 A1 | 5/2007 | Penagulur et al. |
| 2007/0118430 A1 | 5/2007 | Wiseman et al. |
| 2007/0124229 A1 | 5/2007 | Ku et al. |
| 2007/0165050 A1 | 7/2007 | Baar |
| 2007/0202844 A1 | 8/2007 | Wilson et al. |
| 2007/0244633 A1 | 10/2007 | Phillips et al. |
| 2008/0035725 A1 | 2/2008 | Jambunathan et al. |
| 2008/0040216 A1 | 2/2008 | Dellovo |
| 2008/0046415 A1 | 2/2008 | Henkin et al. |
| 2008/0070588 A1 | 3/2008 | Morin |
| 2008/0102947 A1 | 5/2008 | Hays et al. |
| 2008/0109301 A1* | 5/2008 | Yee .................... G06O 30/0226 705/14.27 |
| 2008/0126251 A1 | 5/2008 | Wassingbo |
| 2008/0126515 A1 | 5/2008 | Chambers et al. |
| 2008/0177749 A1 | 7/2008 | Overton |
| 2008/0248815 A1 | 10/2008 | Busch |
| 2008/0262958 A1 | 10/2008 | Ku et al. |
| 2008/0290987 A1 | 11/2008 | Li |
| 2008/0313078 A1 | 12/2008 | Payne |
| 2009/0005077 A1 | 1/2009 | Forstall et al. |
| 2009/0024476 A1 | 1/2009 | Baar et al. |
| 2009/0037101 A1 | 2/2009 | Koike et al. |
| 2009/0061884 A1 | 3/2009 | Rajan et al. |
| 2009/0063229 A1 | 3/2009 | Coladonato et al. |
| 2009/0076911 A1 | 3/2009 | Vo et al. |
| 2009/0076925 A1 | 3/2009 | Dewitt et al. |
| 2009/0099951 A1 | 4/2009 | Pandurangan |
| 2009/0100037 A1 | 4/2009 | Scheibe |
| 2009/0132961 A1 | 5/2009 | Baar |
| 2009/0156234 A1 | 6/2009 | Sako et al. |
| 2009/0198607 A1 | 8/2009 | Badger et al. |
| 2009/0204672 A1 | 8/2009 | Jetha et al. |
| 2010/0293068 A1* | 11/2010 | Drakoulis .............. G06Q 30/08 705/26.3 |
| 2011/0047075 A1 | 2/2011 | Fourez |
| 2011/0173062 A1 | 7/2011 | Chen et al. |
| 2011/0212717 A1 | 9/2011 | Rhoads et al. |
| 2011/0238472 A1 | 9/2011 | Sunkada |
| 2011/0238476 A1 | 9/2011 | Carr et al. |
| 2011/0307338 A1 | 12/2011 | Carlson |
| 2012/0126974 A1 | 5/2012 | Phillips et al. |
| 2012/0129553 A1 | 5/2012 | Phillips et al. |
| 2012/0130796 A1 | 5/2012 | Busch |
| 2012/0150619 A1 | 6/2012 | Jacob Sushil et al. |
| 2012/0191551 A1 | 7/2012 | Lutnick et al. |
| 2012/0239483 A1 | 9/2012 | Yankovich et al. |
| 2012/0239501 A1 | 9/2012 | Yankovich et al. |
| 2013/0006735 A1 | 1/2013 | Koenigsberg et al. |
| 2013/0110624 A1 | 5/2013 | Mitrovic |
| 2013/0150086 A1 | 6/2013 | Caralis et al. |
| 2013/0151366 A1 | 6/2013 | Godsey et al. |
| 2013/0173377 A1 | 7/2013 | Keller et al. |
| 2013/0262231 A1 | 10/2013 | Glasgow et al. |
| 2013/0346233 A1 | 12/2013 | Caralis et al. |
| 2015/0006291 A1 | 1/2015 | Yankovich et al. |
| 2015/0032531 A1 | 1/2015 | Yankovich et al. |
| 2015/0065177 A1 | 3/2015 | Phillips et al. |
| 2015/0148078 A1 | 5/2015 | Phillips et al. |
| 2015/0163632 A1 | 6/2015 | Phillips et al. |

OTHER PUBLICATIONS

"U.S. Appl. No. 11/140,273, Final Office Action dated Jul. 15, 2009", 11 pgs.

"U.S. Appl. No. 11/140,273, Final Office Action dated Dec. 13, 2007", 11 pgs.

"U.S. Appl. No. 11/140,273, Non Final Office Action dated Feb. 26, 2010", 11 pgs.

"U.S. Appl. No. 11/140,273, Non Final Office Action dated May 31, 2007", 10 pgs.

"U.S. Appl. No. 11/140,273, Non Final Office Action dated Jul. 3, 2008", 11 pgs.

"U.S. Appl. No. 11/140,273, Notice of Allowance dated Aug. 3, 2010", 6 pgs.

"U.S. Appl. No. 11/140,273, Preliminary Amendment dated Aug. 30, 2005", 32 pgs.

"U.S. Appl. No. 11/140,273, Response filed Mar. 20, 2007 to Restriction Requirement dated Feb. 21, 2007", 10 pgs.

"U.S. Appl. No. 11/140,273, Response filed Apr. 14, 2008 to Final Office Action dated Dec. 13, 2007", 13 pgs.

"U.S. Appl. No. 11/140,273, Response filed Apr. 21, 2009 to Restriction Requirement dated Jan. 21, 2009", 10 pgs.

"U.S. Appl. No. 11/140,273, Response filed May 26, 2010 to Non Final Office Action dated Feb. 26, 2010", 13 pgs.

"U.S. Appl. No. 11/140,273, Response filed May 27, 2007 to Final Office Action dated Dec. 13, 2007", 18 pgs.

"U.S. Appl. No. 11/140,273, Response filed Oct. 7, 2008 to Non Final Office Action dated Jul. 3, 2008", 17 pgs.

"U.S. Appl. No. 11/140,273, Response filed Nov. 16, 2009 to Non Final Office Action dated Jul. 15, 2009", 19 pgs.

"U.S. Appl. No. 11/140,273, Response filed Nov. 27, 2007 to Non Final Office Action dated May 31, 2007", 12 pgs.

"U.S. Appl. No. 11/140,273, Restriction Requirement dated Jan. 21, 2009", 6 pgs.

"U.S. Appl. No. 11/140,273, Restriction Requirement dated Feb. 21, 2007", 5 pgs.

"U.S. Appl. No. 11/593,047, Supplemental Amendment filed Mar. 18, 2010", 12 pgs.

"U.S. Appl. No. 11/593,047, Advisory Action dated Jan. 29, 2010", 4 pgs.

"U.S. Appl. No. 11/593,047, Applicant,s Summary of Examiner Interview filed Mar. 15, 2010", 2 pgs.

"U.S. Appl. No. 11/593,047, Examiner Interview Summary dated Mar. 12, 2010", 4 pgs.

"U.S. Appl. No. 11/593,047, Examiner Interview Summary dated Jul. 24, 2014", 2 pgs.

"U.S. Appl. No. 11/593,047, Final Office Action dated Dec. 1, 2009", 19 pgs.

"U.S. Appl. No. 11/593,047, Non Final Office Action dated Feb. 2, 2009", 18 pgs.

"U.S. Appl. No. 11/593,047, Non Final Office Action dated Mar. 11, 2014", 18 pgs.

"U.S. Appl. No. 11/593,047, Non Final Office Action dated Sep. 4, 2009", 13 pgs.

"U.S. Appl. No. 11/593,047, Response filed Jan. 22, 2010 to Final Office Action dated Dec. 1, 2009", 23 pgs.

"U.S. Appl. No. 11/593,047, Response filed Apr. 20, 2009 to Non Final Office Action dated Feb. 2, 2009", 33 pgs.

"U.S. Appl. No. 11/593,047, Response filed Jul. 28, 2014 to Non Final Office Action dated Mar. 11, 2014", 10 pgs.

"U.S. Appl. No. 11/593,047, Response filed Nov. 16, 2009 to Non Final Office Action dated Sep. 4, 2009", 20 pgs.

"U.S. Appl. No. 11/690,720, Examiner Interview Summary dated Feb. 22, 2012", 3 pgs.

"U.S. Appl. No. 11/690,720, Final Office Action dated Apr. 27, 2010", 10 pgs.

"U.S. Appl. No. 11/690,720, Final Office Action dated Nov. 9, 2011", 17 pgs.

(56) References Cited

OTHER PUBLICATIONS

"U.S. Appl. No. 11/690,720, Non Final Office Action dated Sep. 25, 2009", 20 pgs.
"U.S. Appl. No. 11/690,720, Non-Final Office Action dated May 17, 2011", 11 pgs.
"U.S. Appl. No. 11/690,720, Notice of Allowance dated May 15, 2012", 7 pgs.
"U.S. Appl. No. 11/690,720, Notice of Allowance dated Aug. 2, 2012", 7 pgs.
"U.S. Appl. No. 11/690,720, Preliminary Amendment filed Mar. 23, 2007", 8 pgs.
"U.S. Appl. No. 11/690,720, Response filed Jan. 28, 2010 to Non Final Office Action dated Sep. 25, 2010", 11 pgs.
"U.S. Appl. No. 11/690,720, Response filed Feb. 15, 2012 to Final Office Action dated Nov. 9, 2011", 14 pgs.
"U.S. Appl. No. 11/690,720, Response filed Aug. 17, 2011 to Non Final Office Action dated May 17, 2011", 13 pgs.
"U.S. Appl. No. 11/690,720, Response filed Aug. 25, 2010 to Final Office Action dated Apr. 27, 2010", 11 pgs.
"U.S. Appl. No. 12/175,512, Final Office Action dated Dec. 7, 2011", 13 pgs.
"U.S. Appl. No. 12/175,512, Non Final Office Action dated Jul. 26, 2011", 12 pgs.
"U.S. Appl. No. 12/175,512, Response filed Mar. 7, 2012 to Final Office Action dated Dec. 7, 2011", 10 pgs.
"U.S. Appl. No. 12/175,512, Response filed Nov. 28, 2011 to Non-Final Office Action dated Aug. 1, 2011", 12 pgs.
"U.S. Appl. No. 12/268,693, Final Office Action dated Dec. 2, 2011", 20 pgs.
"U.S. Appl. No. 12/268,693, Non Final Office Action dated Aug. 8, 2011", 16 pgs.
"U.S. Appl. No. 12/268,693, Response filed Jun. 1, 2012 to Final Office Action dated Dec. 2, 2011", 11 pgs.
"U.S. Appl. No. 12/268,693, Response filed Nov. 8, 2011 to Restriction Requirement dated Aug. 8, 2011", 11 pgs.
"U.S. Appl. No. 12/369,068 , Response filed Nov. 21, 2011 to Final Office Action Aug. 19, 2011", 12 pgs.
"U.S. Appl. No. 12/369,068, Final Office Action dated Aug. 19, 2011", 17 pgs.
"U.S. Appl. No. 12/369,068, Non Final Office Action dated Oct. 8, 2013", 19 pgs.
"U.S. Appl. No. 12/369,068, Non Final Office Action dated Dec. 8, 2010", 19 pgs.
"U.S. Appl. No. 12/369,068, Response filed Feb. 10, 2014 to Non Final Office Action dated Oct. 8, 2013", 14 pgs.
"U.S. Appl. No. 12/369,068, Response filed Jun. 8, 2011 to Non Final Office Action Dec. 8, 2010", 19 pgs.
"U.S. Appl. No. 13/050,769, 312 Amendment filed Sep. 16, 2014", 3 pgs.
"U.S. Appl. No. 13/050,769, Final Office Action dated Jun. 17, 2013", 10 pgs.
"U.S. Appl. No. 13/050,769, Non Final Office Action dated Jan. 11, 2013", 10 pgs.
"U.S. Appl. No. 13/050,769, Notice of Allowance dated Jun. 16, 2014", 8 pgs.
"U.S. Appl. No. 13/050,769, PTO Response to 312 Amendment dated Sep. 25, 2014", 2 pgs.
"U.S. Appl. No. 13/050,769, Response filed Apr. 9, 2013 to Non Final Office Action dated Jan. 11, 2013", 15 pgs.
"U.S. Appl. No. 13/050,769, Response filed Sep. 5, 2013 to Final Office Action dated Jun. 17, 2013", 14 pgs.
"U.S. Appl. No. 13/282,199, Examiner Interview Summary dated Jul. 22, 2014", 3 pgs.
"U.S. Appl. No. 13/282,199, Final Office Action dated Sep. 26, 2013", 25 pgs.
"U.S. Appl. No. 13/282,199, Non Final Office Action dated Apr. 9, 2014", 28 pgs.
"U.S. Appl. No. 13/282,199, Non Final Office Action dated Apr. 29, 2013", 20 pgs.
"U.S. Appl. No. 13/282,199, Response filed Jan. 27, 2014 to Non-Final Office Action dated Sep. 26, 2013", 14 pgs.
"U.S. Appl. No. 13/282,199, Response filed Apr. 4, 2013 to Restriction Requirement dated Mar. 7, 2013", 10 pgs.
"U.S. Appl. No. 13/282,199, Response filed Jul. 17, 2014 to Non Final Office Action dated Apr. 9, 2014", 16 pgs.
"U.S. Appl. No. 13/282,199, Response filed Aug. 28, 2013 to Non Final Office Action dated Apr. 29, 2013", 16 pgs.
"U.S. Appl. No. 13/282,199, Restriction Requirement dated Mar. 7, 2013", 8 pgs.
"U.S. Appl. No. 13/313,681, Non Final Office Action dated Aug. 21, 2012", 23 pgs.
"U.S. Appl. No. 13/313,681, Notice of Allowance dated Feb. 7, 2013", 13 pgs.
"U.S. Appl. No. 13/313,681, Response filed Jan. 21, 2013 to Non Final Office Action dated Aug. 21, 2012", 10 pgs.
"U.S. Appl. No. 13/324,834, 312 Amendment filed Jun. 13, 2017", 8 pgs.
"U.S. Appl. No. 13/324,834, Examiner Interview Summary dated May 6, 2016", 3 pgs.
"U.S. Appl. No. 13/324,834, Examiner Interview Summary dated Jul. 28, 2015", 3 pgs.
"U.S. Appl. No. 13/324,834, Examiner Interview Summary dated Oct. 31, 2016", 3 pgs.
"U.S. Appl. No. 13/324,834, Final Office Action dated Jan. 13, 2014", 13 pgs.
"U.S. Appl. No. 13/324,834, Final Office Action dated Apr. 28, 2015", 20 pgs.
"U.S. Appl. No. 13/324,834, Final Office Action dated Aug. 2, 2016", 16 pgs.
"U.S. Appl. No. 13/324,834, Non Final Office Action dated Mar. 9, 2016", 19 pgs.
"U.S. Appl. No. 13/324,834, Non Final Office Action dated Aug. 14, 2013", 12 pgs.
"U.S. Appl. No. 13/324,834, Non Final Office Action dated Aug. 27, 2014", 16 pgs.
"U.S. Appl. No. 13/324,834, Notice of Allowance dated May 30, 2017", 10 pgs.
"U.S. Appl. No. 13/324,834, PTO Response to Rule 312 Communication dated Jun. 26, 2017", 2 pgs.
"U.S. Appl. No. 13/324,834, Response filed Feb. 27, 2015 to Non Final Office Action dated Aug. 27, 2014", 23 pgs.
"U.S. Appl. No. 13/324,834, Response filed Apr. 14, 2014 to Final Office Action dated Jan. 13, 2014", 9 pgs.
"U.S. Appl. No. 13/324,834, Response filed Jun. 1, 2016 to Non Final Office Action dated Mar. 9, 2016", 15 pgs.
"U.S. Appl. No. 13/324,834, Response filed Jul. 28, 2015 to Final Office Action dated Apr. 28, 2015", 19 pgs.
"U.S. Appl. No. 13/324,834, Response filed Nov. 2, 2016 to Final Office Action dated Aug. 2, 2016", 20 pgs.
"U.S. Appl. No. 13/324,834, Response filed Nov. 13, 2013 to Non Final Office Action dated Aug. 14, 2013", 10 pgs.
"U.S. Appl. No. 13/339,235, Final Office Action dated Jan. 27, 2017", 16 pgs.
"U.S. Appl. No. 13/339,235, Final Office Action dated Aug. 29, 2012", 11 pgs.
"U.S. Appl. No. 13/339,235, Final Office Action Dec. 2, 2014", 7 pgs.
"U.S. Appl. No. 13/339,235, Non Final Office Action dated Feb. 12, 2015", 4 pgs.
"U.S. Appl. No. 13/339,235, Non Final Office Action dated Mar. 16, 2012", 10 pgs.
"U.S. Appl. No. 13/339,235, Non Final Office Action dated May 16, 2016", 15 pgs.
"U.S. Appl. No. 13/339,235, Non Final Office Action dated Aug. 18, 2014", 4 pgs.
"U.S. Appl. No. 13/339,235, Non Final Office Action dated Sep. 18, 2015", 14 pgs.
"U.S. Appl. No. 13/339,235, Notice of Allowance dated Apr. 25, 2014", 8 pgs.
"U.S. Appl. No. 13/339,235, Response filed Jan. 19, 2016 to Non Final Office Action dated Sep. 18, 2015", 21 pgs.

(56) References Cited

OTHER PUBLICATIONS

"U.S. Appl. No. 13/339,235, Response filed Feb. 2, 2015 to Final Office Action dated Dec. 2, 2014", 12 pgs.
"U.S. Appl. No. 13/339,235, Response filed Apr. 27, 2017 to Final Office Action dated Jan. 27, 2017", 23 pgs.
"U.S. Appl. No. 13/339,235, Response filed May 12, 2015 to Non Final Office Action dated Feb. 12, 2015", 33 pgs.
"U.S. Appl. No. 13/339,235, Response filed Jun. 15, 2012 to Non Final Office Action dated Mar. 16, 2012", 11 pgs.
"U.S. Appl. No. 13/339,235, Response filed Aug. 16, 2016 to Non Final Office Action dated May 16, 2016", 23 pgs.
"U.S. Appl. No. 13/339,235, Response filed Nov. 18, 2014 to Non Final Office Action dated Aug. 18, 2014", 20 pgs.
"U.S. Appl. No. 13/339,235, Response filed Nov. 29, 2012 to Final Office Action dated Aug. 29, 2012", 11 pgs.
"U.S. Appl. No. 13/340,970, Advisory Action dated Feb. 13, 2014", 3 pgs.
"U.S. Appl. No. 13/340,970, Final Office Action dated Sep. 26, 2013", 18 pgs.
"U.S. Appl. No. 13/340,970, Non Final Office Action dated Apr. 12, 2013", 17 pgs.
"U.S. Appl. No. 13/340,970, Response filed Feb. 25, 2014 to Advisory Action dated Feb. 13, 2014", 10 pgs.
"U.S. Appl. No. 13/340,970, Response filed Jul. 12, 2013 to Non Final Office Action dated Apr. 12, 2013", 10 pgs.
"U.S. Appl. No. 13/340,970; Response filed Jan. 27, 2014 to Final Office Action dated Sep. 26, 2013", 10 pgs.
"U.S. Appl. No. 13/361,113, 312 Amendment filed Oct. 29, 2014", 6 pgs.
"U.S. Appl. No. 13/361,113, Non Final Office Action dated Feb. 13, 2014", 13 pgs.
"U.S. Appl. No. 13/361,113, Notice of Allowance dated Aug. 1, 2014", 8 pgs.
"U.S. Appl. No. 13/361,113, PTO Response to 312 Amendment dated Nov. 6, 2014", 2 pgs.
"U.S. Appl. No. 13/361,113, Response filed May 13, 2014 to Non Final Office Action dated Feb. 13, 2014", 13 pgs.
"U.S. Appl. No. 13/361,113, Supplemental Notice of Allowability dated Sep. 17, 2014", 2 pgs.
"U.S. Appl. No. 13/361,196, Examiner Interview Summary dated Apr. 22, 2013", 3 pgs.
"U.S. Appl. No. 13/361,196, Final Office Action dated Jan. 22, 2013", 15 pgs.
"U.S. Appl. No. 13/361,196, Non Final Office Action dated Jan. 3, 2014", 11 pgs.
"U.S. Appl. No. 13/361,196, Non Final Office Action dated Mar. 29, 2012", 12 pgs.
"U.S. Appl. No. 13/361,196, Non Final Office Action dated Aug. 23, 2012", 13 pgs.
"U.S. Appl. No. 13/361,196, Notice of Allowance dated Jun. 10, 2014", 8 pgs.
"U.S. Appl. No. 13/361,196, Response filed Apr. 2, 2014 to Non Final Office Action dated Jan. 3, 2014", 7 pgs.
"U.S. Appl. No. 13/361,196, Response filed Apr. 18, 2013 to Final Office Action Jan. 22, 2013", 10 pgs.
"U.S. Appl. No. 13/361,196, Response filed Jun. 21, 2012 to Non Final Office Action dated Mar. 29, 2012", 9 pgs.
"U.S. Appl. No. 13/361,196, Response filed Nov. 21, 2012 to Non Final Office Action dated Aug. 23, 2012", 13 pgs.
"U.S. Appl. No. 13/436,370, Examiner Interview Summary dated May 7, 2015", 3 pgs.
"U.S. Appl. No. 13/436,370, Final Office Action dated Jun. 12, 2015", 18 pgs.
"U.S. Appl. No. 13/436,370, Final Office Action dated Oct. 13, 2016", 14 pgs.
"U.S. Appl. No. 13/436,370, Non Final Office Action dated Mar. 25, 2016", 18 pgs.
"U.S. Appl. No. 13/436,370, Non Final Office Action dated Nov. 5, 2014", 15 pgs.

"U.S. Appl. No. 13/436,370, Response filed May 4, 2015 to Non Final Office Action dated Nov. 5, 2014", 30 pgs.
"U.S. Appl. No. 13/436,370, Response filed Aug. 25, 2016 to Non Final Office Action dated Mar. 25, 2016", 15 pgs.
"U.S. Appl. No. 13/436,370, Response filed Oct. 6, 2015 to Final Office Action dated Jun. 12, 2015", 20 pgs.
"U.S. Appl. No. 13/913,768, Preliminary Amendment dated Dec. 3, 2013", 8 pgs.
"U.S. Appl. No. 14/486,518, Final Office Action dated Dec. 8, 2015", 7 pgs.
"U.S. Appl. No. 14/486,518, Non Final Office Action dated May 21, 2015", 9 pgs.
"U.S. Appl. No. 14/486,518, Non Final Office Action dated Nov. 30, 2016", 13 pgs.
"U.S. Appl. No. 14/486,518, Preliminary Amendment filed Oct. 8, 2014", 9 pgs.
"U.S. Appl. No. 14/486,518, Response Filed Apr. 8, 2016 to Final Office Action dated Dec. 8, 2015", 10 pgs.
"U.S. Appl. No. 14/486,518, Response filed May 1, 2017 to Non Final Office Action dated Nov. 30, 2016", 21 pgs.
"U.S. Appl. No. 14/486,518, Response filed Aug. 21, 2015 to Non Final Office Action dated May 21, 2015", 17 pgs.
"U.S. Appl. No. 14/512,350, Final Office Action dated Nov. 30, 2015", 7 pgs.
"U.S. Appl. No. 14/512,350, Non Final Office Action dated Mar. 11, 2016", 7 pgs.
"U.S. Appl. No. 14/512,350, Non Final Office Action dated May 22, 2015", 10 pgs.
"U.S. Appl. No. 14/512,350, Non Final Office Action dated Nov. 2, 2016", 14 pgs.
"U.S. Appl. No. 14/512,350, Preliminary Amendment dated Nov. 26, 2014", 10 pgs.
"U.S. Appl. No. 14/512,350, Response filed Feb. 29, 2016 to Final Office Action dated Nov. 30, 2015", 10 pgs.
"U.S. Appl. No. 14/512,350, Response filed Apr. 3, 2017 to Non Final Office Action dated Nov. 2, 2016", 25 pgs.
"U.S. Appl. No. 14/512,350, Response filed Jun. 13, 2016 to Non-Final Office Action filed Mar. 11, 2016", 16 pgs.
"U.S. Appl. No. 14/512,350, Response filed Aug. 24, 2015 to Non Final Office Actio dated May 22, 2015", 20 pgs.
"U.S. Appl. No. 14/534,797, Preliminary Amendment dated Nov. 14, 2014", 8 pgs.
"U.S. Appl. No. 14/611,210, Preliminary Amendment filed Feb. 4, 2015", 8 pgs.
"U.S. Appl. No. 14/624,083, Preliminary Amendment filed Mar. 6, 2015", 9 pgs.
"Foursquare", Wikipedia, [Online]. Retrieved from the Internet: <http://en.wikipedia.org/wiki/Foursquare>, (Accessed Apr. 16, 2013), 12 pgs.
"Halfbakery: Buddy Locator", [Online]. Retrieved from the Internet: <URL: http://www.halfbakery.com/idea/Buddy_20Locator#1055455737>, (Jun. 11, 2003), 2 pgs.
"Halfbakery: Mobile phone utility", [Online]. Retrieved from the Internet: <URL: http://www.halfbakery.com/idea/mobile_20phone_20utility#1073585857>, (Jan. 8, 2004), 2 pgs.
"Halfbakery: Mobile Proximity Link", [Online]. Retrieved from the Internet: <URL: http://www.halfbakery.com/idea/Mobile_20Proximity_20Link#1001923289>, (Sep. 30, 2001), 2 pgs.
"Networks in Motion Named Semi-Finalist for Wireless LBS Challenge", [Online]. Retrieved from the Internet: <URL: http://www.tmcnet.com/usubmiU2004/Mar/1025200.htm>, (Mar. 18, 2004), 1 pg.
"Proposal for free, open source cell phone location service", 90% Crud, [Online]. Retrieved from the Internet: <URL: http://george.hotelling.net/90percent/geekery/proposal_for_free_open_source_cell_phone_location_service.php>, (Mar. 6, 2004), 1 pg.
"SignalSoft Corporation awarded location-based services patent", [Online]. Retrieved from the Internet: <URL: http://www.cellular.co.za/news 2001/04282001-signalsoft-patent.htm>, (Apr. 27, 2001), 1 pg.
Carpendale, Marianne S.T, "A Framework for Elastic Presentation Space", Burnaby, British Columbia, Simon Fraser University, (1999), 296 pgs.

(56) References Cited

OTHER PUBLICATIONS

Du, Preez, et al., "System and method for online auctions", [Online] retrieved from the internet: <https://search.proquest.com/docview/753696990?accountid=14753>.

Keath, Jason, "21 Unique Location Examples from Foursquare", Gowalla, Whrrl, and MyTown, Socialfresh.com, (Jun. 1, 2010), 9 pgs.

Klemperer, Paul, "Auctions: Theory and Practice", Princeton University Press, (2004), 6 pgs.

Manninen, JP, ""Geofencing" enables new location-based apps, raises privacy concerns.", VentureBeat, [Online]. Retrieved from the Internet: <URL: http://venturebeat.com/2010/04/23/ geofencing -pushes-services-to-phones/ >, (Apr. 23, 2010), 4 pgs.

Yankovich, Steve, et al., "Targeted Incentive Actions Based on Location and Intent", U.S. Appl. No. 13/050,769, filed Mar. 17, 2011, 47 pgs.

* cited by examiner

US 10,395,307 B2

MOBILE APPLICATION TO CONDUCT AN AUCTION BASED ON PHYSICAL PRESENCE

CLAIM OF PRIORITY

This application is a continuation of U.S. application Ser. No. 13/324,834, filed on Dec. 13, 2011, which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011 eBay, Inc., All Rights Reserved.

TECHNICAL FIELD

This patent document pertains generally to computer networking, and more particularly, but not by way of limitation, to a mobile application to conduct an auction based on physical presence.

BACKGROUND

For centuries, auctions have been conducted in the physical world, usually being led by a professional auctioneer who continuously announces a current highest bid for an item being sold at auction. Silent auctions may also be conducted where auction participants write down bids on pieces of paper that describe the item being sold. More recently, auctions can be conducted over the Internet where participants log into a website to bid on the item being sold.

BRIEF DESCRIPTION OF DRAWINGS

Some embodiments are illustrated by way of example and are not restricted to any limitation in the figures of the accompanying drawings.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

To boost sales, merchants in bricks-and-mortar stores may desire to increase a level of excitement within the store among the customers. One way to do so is to offer an item for sale at a substantially reduced price. However, a merchant may not desire to discount a price any more than necessary. Embodiments described herein allow a merchant to initiate an auction of an item for sale among the customers who are already at the store. Further, embodiments allow a merchant to conduct an auction without shifting employee resources from other job responsibilities.

While the systems and methods described herein discuss using in-store communications with customers to conduct an auction, it is understood that the systems and methods may be used more generally to distribute information to customers within the store. For example, the systems and methods described herein may be used to announce a special discount or other incentive available only to the customers presently within a predefined geographical area that includes the store.

Figure 1:
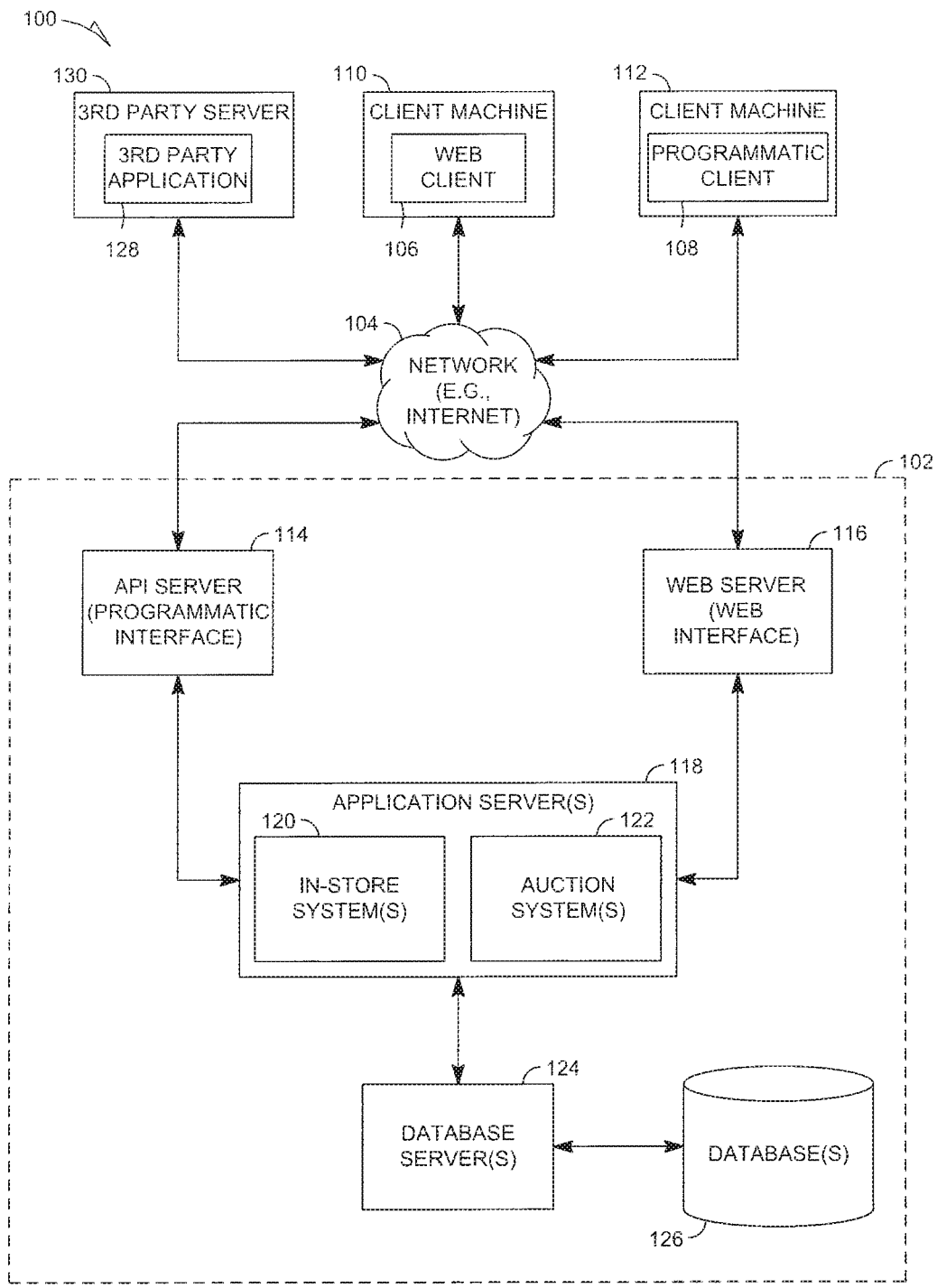
FIG. 1 is a network diagram depicting a client-server system within which one example embodiment may be deployed.

FIG. 1 is a network diagram depicting a client-server system 100, within which one example embodiment may be deployed. A networked system 102, in the example forms of a network-based marketplace or publication system for a store, provides server-side functionality, via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more in-store systems 120 and auction system 122. The application servers 118 are, in turn, shown to be coupled to one or more databases servers 124 that facilitate access to one or more databases 126.

The in-store system 120 may provide a number of functions and services to users that access the networked system 102. These functions may include, for example, inventory systems, accounting systems, and the like. The auction systems 122 may provide a number of auction-related services and functions to users. The auction systems 122 may allow users to identify items being auctioned, register for auctions, and bid in auctions. While the in-store system 120 and the auction system 122 are shown in FIG. 1 to both form part of the networked system 102, it will be appreciated that, in alternative embodiments, the auction systems 122 may form part of an auction service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various in-store systems 120 and auction systems 122 could also be implemented as stand-alone software programs, which do not necessarily have networking capabilities.

The web client 106 accesses the various in-store systems 120 and auction systems 122 via the web interface supported by the web server 116. Similarly, the programmatic client 108 accesses the various services and functions provided by the in-store systems 120 and auction systems 122 via the programmatic interface provided by the API server 114. The programmatic client 108 may, for example, be a merchant application to enable merchants to author and manage auctions on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Figure 2:
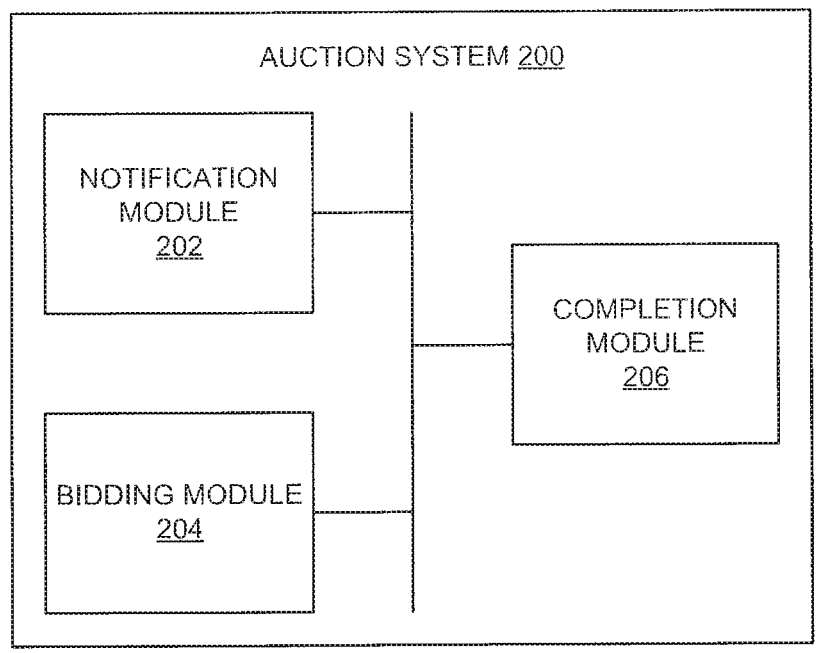
FIG. 2 is a block diagram of an auction system, according to an example embodiment.

FIG. 2 is a block diagram of an auction system 200, according to an example embodiment. The auction system 200 may be one of the auction systems 122 of FIG. 1. The auction system 200 may be implemented in hardware, software, or a combination thereof. In some instances, the auction system 200 may reside, in part, in the auction systems 122 and, in part, on a client machine (e.g., client machine 110 or client machine 112).

A notification module 202 is configured to identify an item to be auctioned and an auction time. In some instances, an auction may be pre-scheduled by a merchant or initiated based on a pre-defined trigger which is implemented by the notification module 202. In one embodiment the notification module is a memory storage device storing flash auction specific information that is used by other modules within the system to implement auction timing and configuration according to the information stored in the notification module 202. In some embodiments the notification module 202 is a control module which receives the inputs of the merchant and configures the system to implement and enable an in-store or flash auction. To illustrate, a merchant may schedule an auction for a particular item to begin at a certain time or may specify that an auction be triggered if a specified number of items remain in inventory or if an item is discontinued or otherwise no longer considered a top selling item. The notification module 202 is responsible for notifying near-by shoppers of the flash auction. In some instances, an auction may be spontaneously initiated by the merchant by providing instruction to the notification module 202 to send notifications to near-by shoppers. Some merchants may initiate an auction in response to receiving a request from a customer requesting that the merchant auction a particular item.

The auction is defined by the merchant. For example, the merchant may dictate the item(s) being auctioned, how a winner is determined, duration of the auction, a maximum or minimum number of auction participants, a qualification to participate in the auction, or the like. In auctions for a single item, the highest bid may determine the winner of the auction. Some merchants may require, for example, that a customer belong to a loyalty program or other membership to participate in the auction. In some instances, an auction may be made available to only customers who have a store credit card, or a particular spending level of the store credit card. In some embodiments, shoppers register for flash auction notifications, which they then receive when proximate the physical location of the auction initiator. The notification may include a visual description of the item for auction, which may be a drawing, a photo, a video or other descriptor.

In some instances, the merchant may use the system to initiate multiple auction processes or multiple instances of items for auction. For example, the merchant may designate a number of substantially identical items for sale to be auctioned in a single auction. The merchant may use the system to auction five television sets in a single auction, for example. In auctions where a quantity of substantially identical items is auctioned, a top number of bids may determine the winners of the auction. In other instances, a top bid may determine a first winner of the auction and the price of the item for the other bidders to optionally purchase the item.

The notification module 202, upon identifying an auction, further determines a pre-auction window. The pre-auction window is a period of time before the beginning of the auction during which customers are notified about the auction and allowed to register to participate in the auction. The pre-auction window may be, for example, ten minutes before the start of the auction. The pre-auction window may close before the start of the auction, simultaneously with the start of the auction, or after the auction has already begun.

During the pre-auction window, the notification module 202 transmits auction notification messages to client machines (e.g., a mobile device such as a smart phone) located within a pre-defined geographical area including, and in the vicinity of, the merchant's brick and mortar store. The predefined geographical area may include, for example, a parking lot, a shopping center where the merchant is located, a street or neighborhood where the store is located, or the like. The auction notification message may be an application notification, as supported by mobile operating systems such as the iOS and Android operating systems. In some instances, the auction notification message may be an SMS (short message service) message, an MMS (multimedia message service) message, or an email message. The auction notification message may include information about the auction or the item being auctioned and an option for the user to open an auction application on the client machine to register for the auction. The notification may include a map or step-by-step directions from the recipient's current location to the merchant. The notification module 202 may be dynamically adjusted for ease of use by the merchant in setting up the auction and to the shoppers to participate in the auction. In some embodiments, the shopper may choose to participate remotely rather than enter the store until completion of the auction.

To register to participate in an auction, a user of the client machine may select the notification or an option within the notification to navigate to an application installed on the client machine. To allow the user to participate, the application may automatically, without human intervention, register the user upon receiving the selection of the notification. In other embodiments, the user may register for the auction by responding to prompts requesting a user identifier, password, mobile phone number, or other information. The application may facilitate the user's participation in the auction by providing a bidding interface to the user.

The bidding module 204 is configured to conduct the auction by providing an auction interface to the client machines belonging to users participating in the auction. The client machines are located within a predefined geographical area that may include the store and the vicinity of the store.

The location of the client machines may be determined based on input received from a global positioning system (GPS) or a triangulation of cell signals. In some instances, the client machines may be tracked using sensors located within the stores or using wireless tracking systems. In some embodiments, a user may check-in to the store using a Bluetooth-enabled client machine or using a check in station where a user can tell the store that the user is in the store (via near field communications (NFC) or a barcode scan). Where a shopping application is available for smart phones or other client machines, all or part of the auction system 200 may be coincident with the shopping application. In some embodiments, the auction system 200 accesses the shopping application for information, such as location of the merchant.

The auction interface provided at the client machines includes an option to bid on the item being auctioned. The auction interface may include a description of the item to be auctioned, an indication of a current high bid for the item, and one or more options to bid on the item. The bidding module 204 receives bids from the client machines and tracks the auction participants. The bidding module 204 may further determine when an auction ends. An auction may end after a predefined period of time, after a reserve price is met, or some other trigger that operates to end the auction.

Upon the ending of an auction, a completion module 206 is configured to transmit a confirmation to at least one winning auction participant. The winning auction participant may be an auction participant who has submitted a highest bid for the item during the auction. In some embodiments, an auction participant may be disqualified from winning the auction by, for example, leaving the predefined geographical area during the auction. In instances where the winning auction participant is disqualified, a second auction participant may be selected to be the winning auction participant.

In some instances, the completion module 206 may identify more than one winning auction participant if, for example, a quantity of items is being auctioned. The completion module 206 may identify the winning participants based on the participants who bid on the item. The participants may be offered the auctioned item for the bid amount submitted by the participant or for the highest bid amount submitted during the auction.

The confirmation sent by the completion module 206 may include instructions for claiming the item. For example, the confirmation message may include directions to a location (e.g., a customer service counter) within the store, a time limit in which the item can be purchased, a secret code that can be used by the store employees to confirm that the person claiming the item has actually won the auction, or the like.

In some instances, the completion module 206 may further send messages to participants who have not won the auction. The sent messages may include a discount or coupon that can be used within the store. In some embodiments, the message may include a coupon that applies a dollar amount to the recipient's next auction with the merchant.

Figure 3:
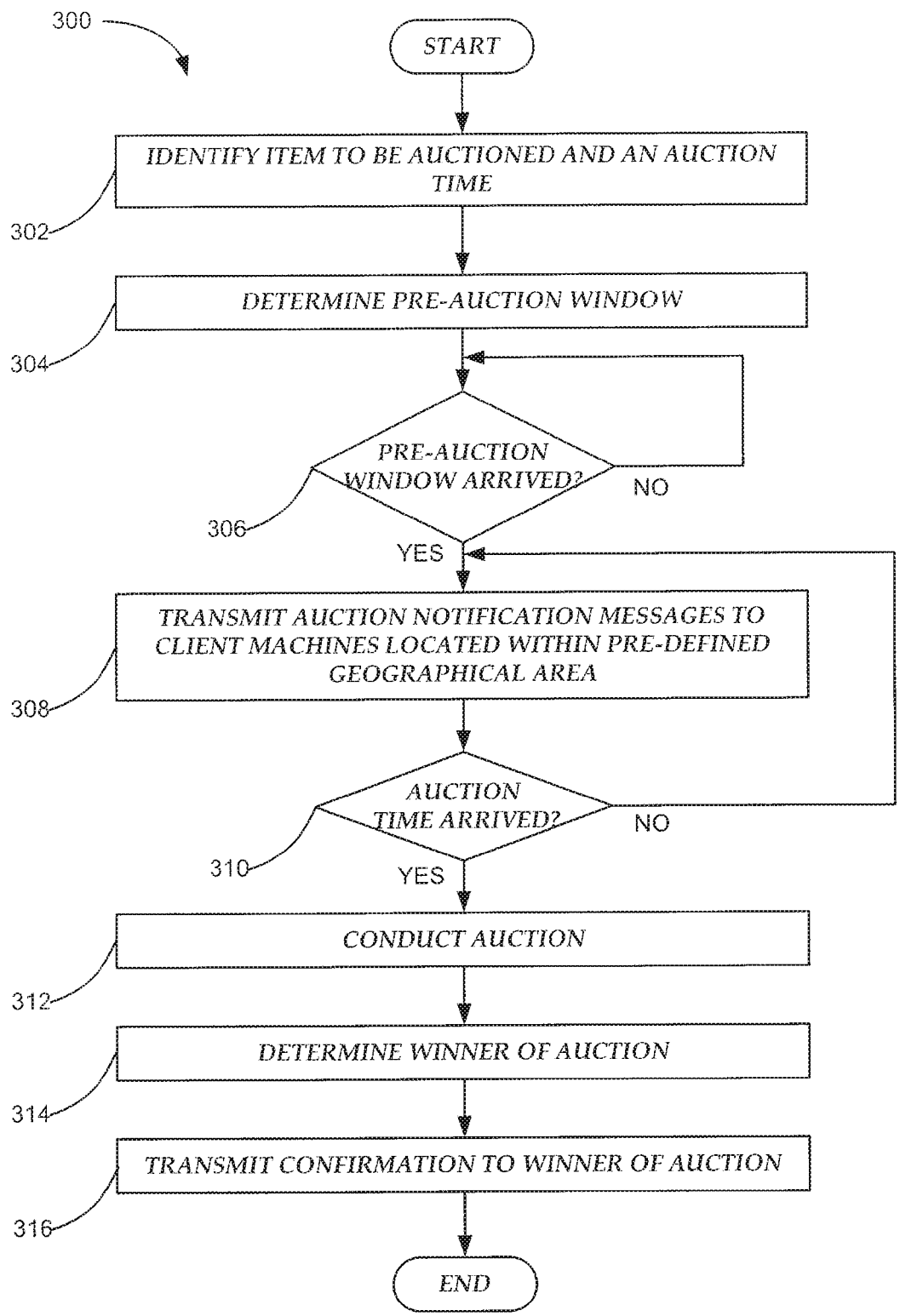
FIG. 3 is a flow chart illustrating a method to conduct an auction based on physical presence, according to an example embodiment.

FIG. 3 is a flow chart illustrating a method 300 to conduct an auction based on physical presence, according to an example embodiment. The method 300 may be performed by the auction system 200.

In an operation 302, an auction is defined by identifying an item (or quantity of items) to be auctioned and an auction time. The auction definition may include further information about the auction such as a minimum number of participants, a predefined geographical area in which to identify the participants, a reserve price to be met, and the like. In some embodiments, a recipient of an auction notification may forward the message to a member(s) of a social network to let the social network member(s) participate.

In an operation 304, a pre-auction window is determined. The pre-auction window is a period of time occurring before the auction during which shoppers may register to participate in the auction. In some embodiments the shopper may automatically register for an auction by placing a bid. In an operation 306, a determination is made as to whether the pre-auction window has arrived. If the pre-auction window has not arrived, the method 300 pauses until the pre-auction window arrives. The pre-auction window arrival may be triggered on elapsed time, a target number of users registering to participate in the auction, a time of day, and so forth.

In an operation 308, if the pre-auction window has arrived, auction notification messages are transmitted to client machines within the pre-defined geographical area. The notification may be a text message, an email, chat, tweet or other means of communication. The notification messages may include an option selectable by the user of the client machine to register for the auction. The user may register using a telephone number, a username, or some other identifier associated with the user.

In an operation 310, a determination is made as to whether the auction time has arrived. If the auction time has not arrived, auction notification messages may continue to be transmitted to client machines within the pre-defined geographical area.

If the auction time has arrived, the auction is conducted in an operation 312. The auction is conducted by accepting bids from client machines. In some instances, the client machines need not be registered prior to the auction and may be able to register during the auction by, for example, accessing an auction interface from a notification sent to the client machine and submitting a bid using the client machine.

In an operation 314, when the auction is complete, the winner of the auction is determined. The auction may be complete after a period of time has elapsed, for example. In some instances, more than one winner is identified. The winner may have submitted a highest bid during the auction.

In an operation 316, a confirmation is transmitted to the winner of the auction. The confirmation may include directions for claiming the item.

Figure 4:
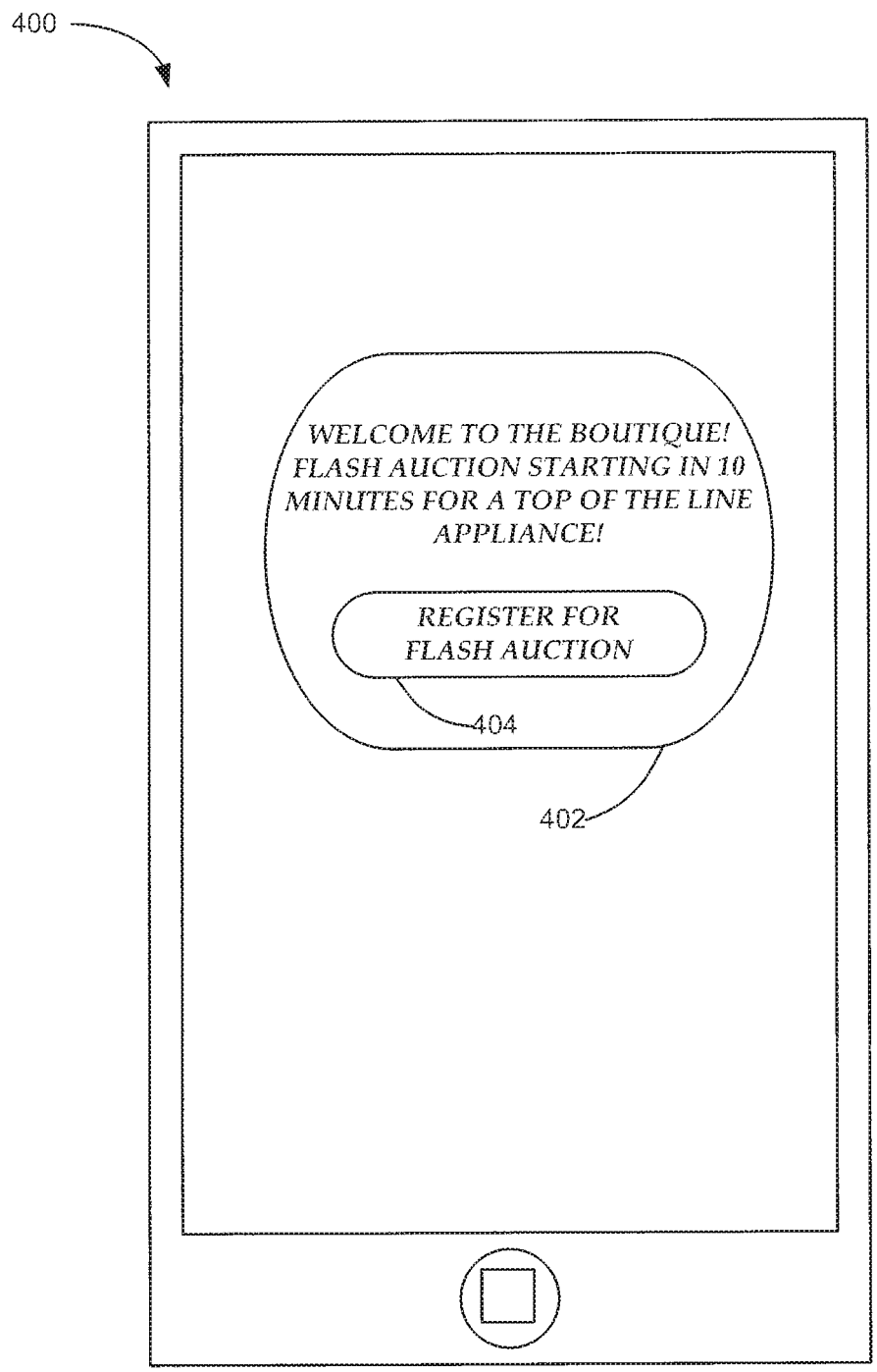
FIG. 4 depicts a portion of a user interface including an example auction notification, according to an example embodiment.

FIG. 4 depicts a portion of a user interface 400 including an example auction notification 402, according to an example embodiment. The auction notification 402 may be a message that is displayed on the screen or a portion of the screen to the user. The auction notification 402 may be temporally displayed or may only be hidden or closed by the user of the client machine. The auction notification 402 may be a text message or other message sent to the client machine. In some instances, the auction notification 402 is an application notification accessible via a mobile application residing on the client machine.

As depicted, the auction notification 402 includes an indication of the auction time and the item to be auctioned. The auction notification 402 further includes an option 404 that allows the user to register for the auction. In some instances, the user may be automatically registered upon selecting the option 404. In other instances, the user, upon selecting the option 404, may navigate to another user interface to register to participate. The user may be prompted to provide a user identifier or telephone number.

In some embodiments, shoppers may send a request to a given merchant requesting initiation of a flash auction. In this example, the merchant may respond to initiate an auction by sending a notification.

Figure 5:
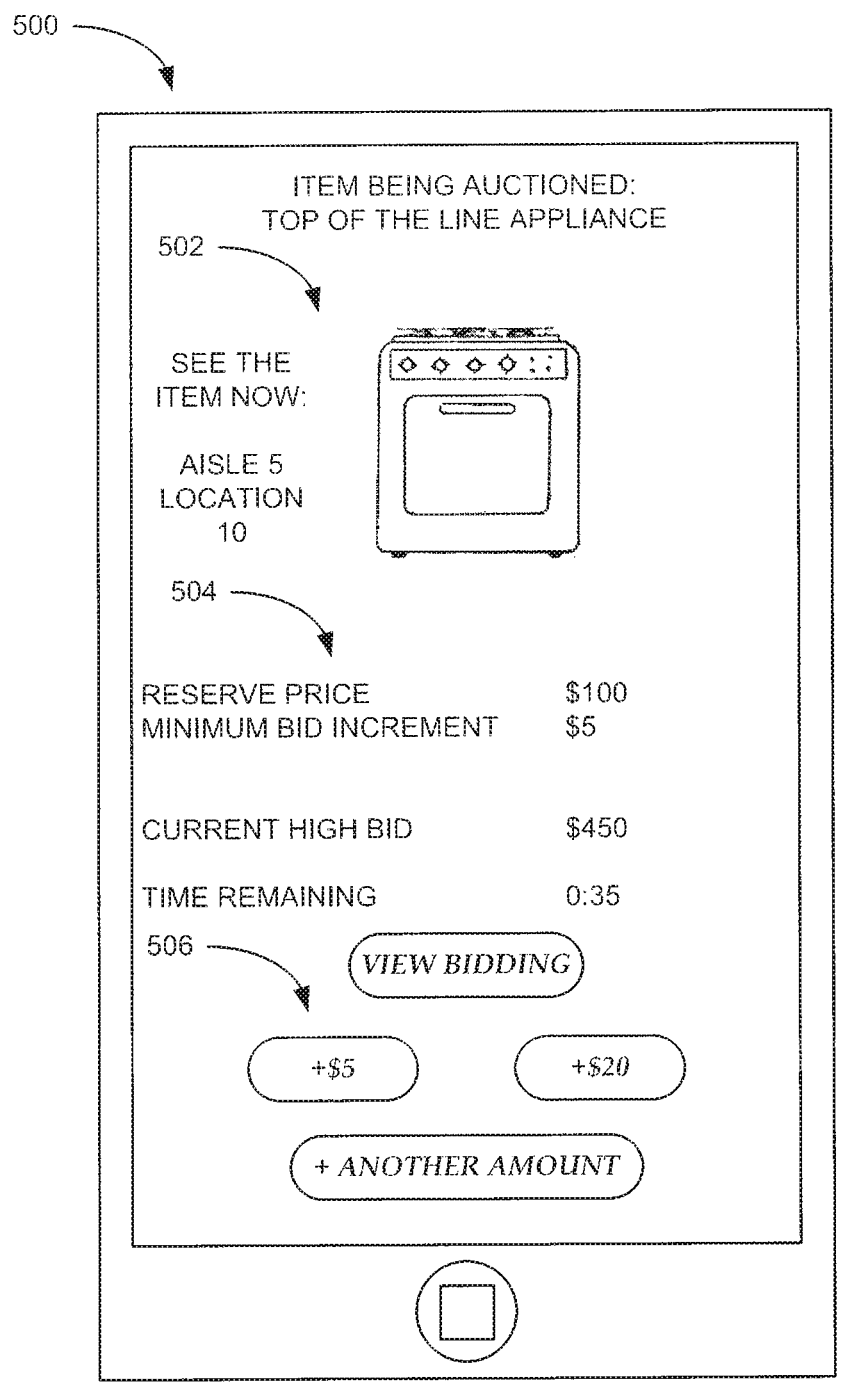
FIG. 5 depicts a portion of a user interface including an example auction interface, according to an example embodiment.

FIG. 5 depicts a portion of a user interface including an example auction interface 500, according to an example embodiment. The auction interface 500 includes a description 502 of the item being auctioned. As depicted, the description 502 includes a name of the item, an image of the item, and an indication of an in-store location of the item. Additional information may be accessible or presented to the user as part of the description 502.

An auction information portion 504 of the auction interface 500 may include information about the auction being conducted. The auction information portion 504 may include an indication of a reserve price, a minimum bid increment, a current high bid, and an amount of time remaining in the auction.

In some embodiments, an auction interface 500 may be presented to registered participants before the auction begins. Before the auction begins, the auction interface 500 may include the description 502 and the auction information portion 504. The auction information panel 504 may be modified to indicate the reserve price, the minimum bid increment, a current number of registered participants, and an amount of time remaining before the auction begins.

A bidding portion 506 of the auction interface 500 presented during the auction includes options selectable by the user to view the bidding action or to submit a bid. The bidding portion 506 may include a plurality of bidding options, such as an option to bid a minimum bid increment, a different bid increment, or a user-specified bid increment. In some instances, a user may provide a total bid amount rather than a bid increment.

Figure 6:
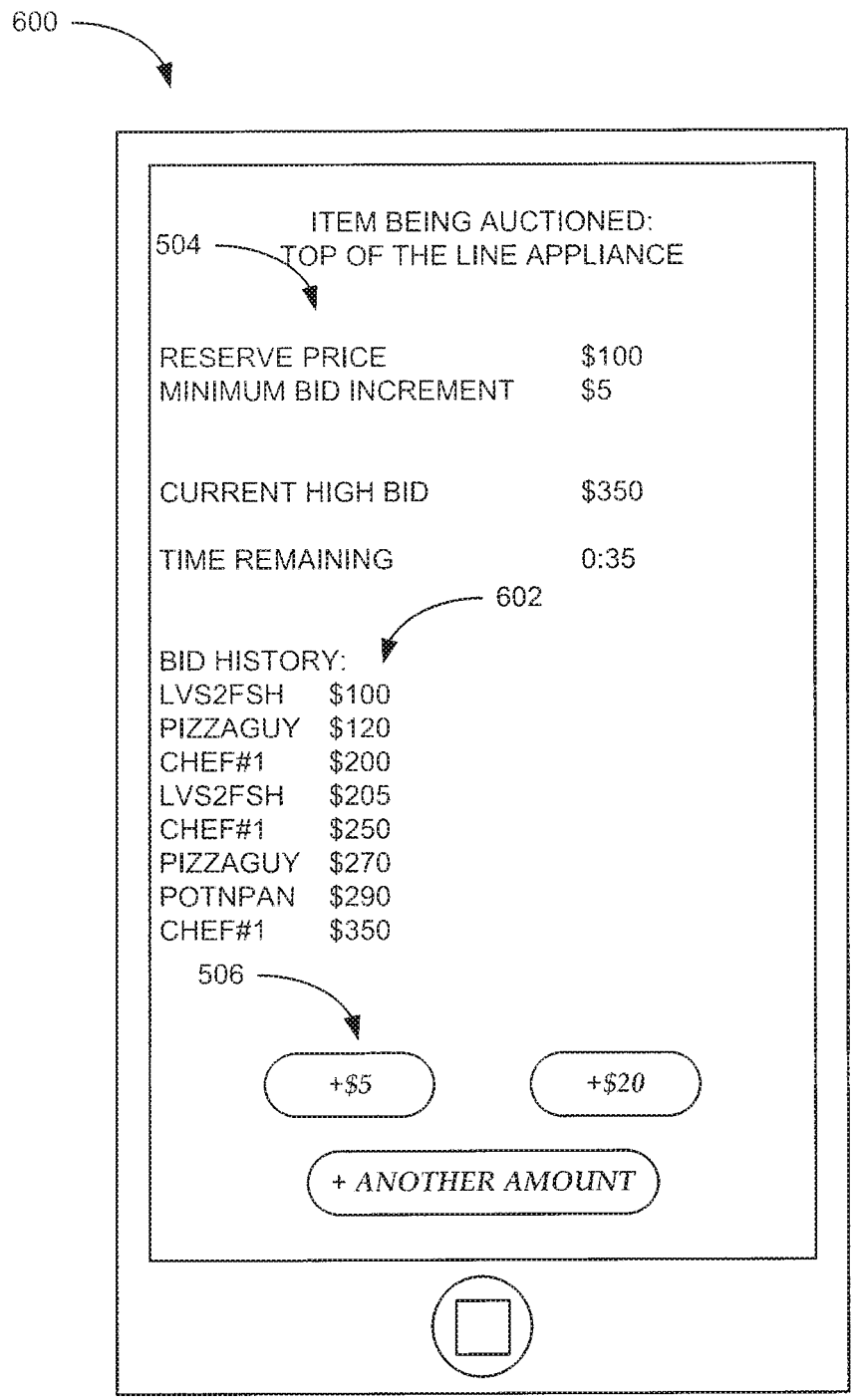
FIG. 6 depicts a portion of a user interface including an example bid history interface, according to an example embodiment.

FIG. 6 depicts a portion of a user interface including an example bid history interface 600, according to an example embodiment. The bid history interface 600 may be accessible from the auction interface 500 by selecting an option to view bidding. The bid history interface 600 includes the auction information panel 504 and the bidding portion 506. The bid history interface 600 additionally includes a list 602 of the bids previously submitted by the auction participants. The list 602 identifies the bidders and the bid submitted by each bidder.

Figure 7:
FIG. 7 depicts a portion of a user interface including an example confirmation, according to an example embodiment.

FIG. 7 depicts a portion of a user interface including an example confirmation 700, according to an example embodiment. As depicted, the confirmation 700 is a notification. The confirmation 700 may be another message sent to the client machine. The confirmation 700 includes an indication that the user of the client machine has won the auction and provides instructions for completing the auction transaction. The confirmation 700 may include additional information, such as a final price of the item, a secret code to allow the employees of the store to confirm the identity of the winner or winners, or the like. In some instance, the confirmation 700 may include a barcode encoded with info identifying customer as auction winner where the barcode is capable of being scanned from the display of the client machine.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 8:
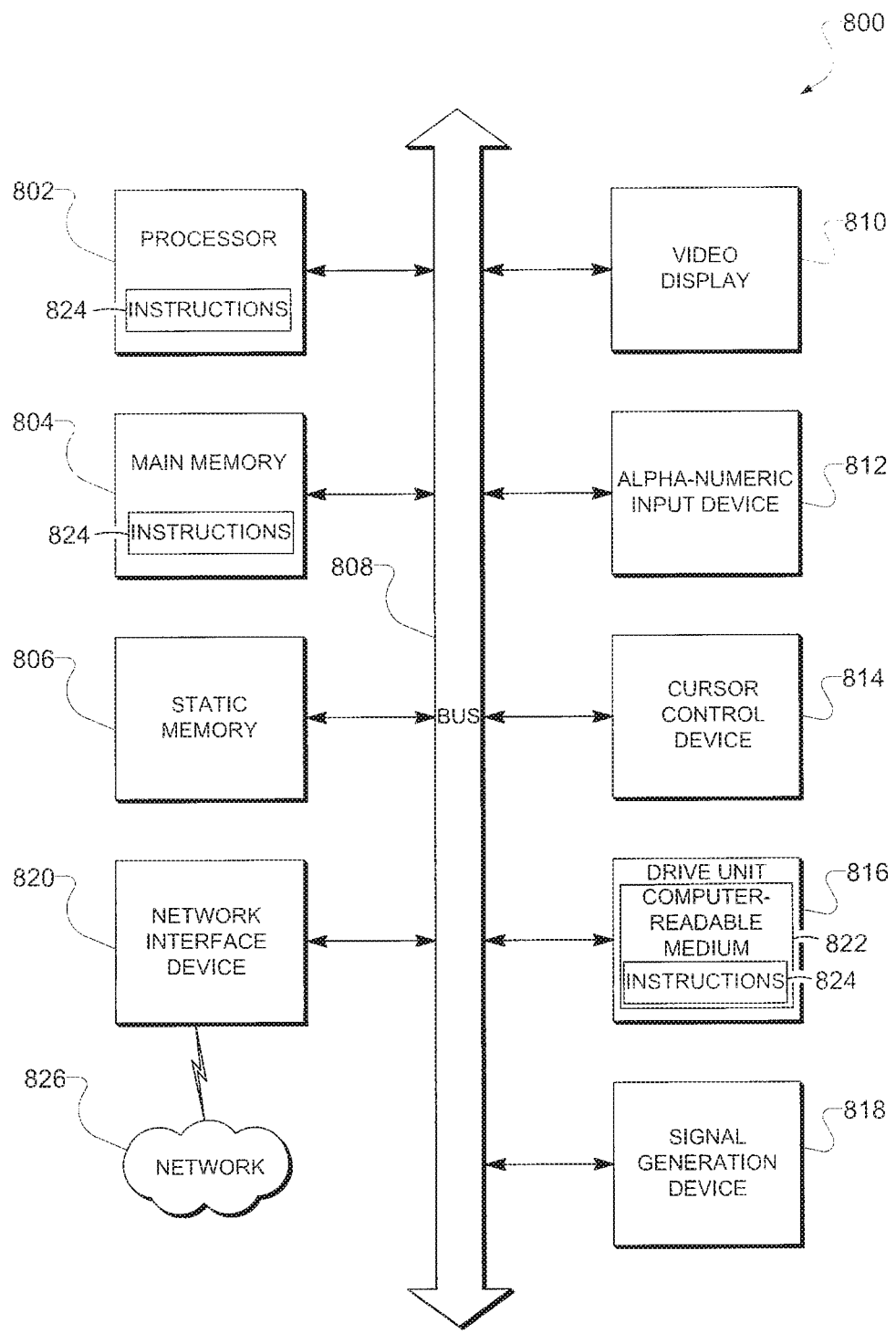
FIG. 8 is a block diagram of machine in the example form of a computer system within which a set instructions, for causing the machine to perform any one or more of the methodologies discussed herein, may be executed.

FIG. 8 is a block diagram of machine in the example form of a computer system 800 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard or touch-sensitive display screen), a user interface (UI) navigation device 814 (e.g., a mouse), a disk drive unit 816, a signal generation device 818 (e.g., a speaker) and a network interface device 820.

Machine-Readable Medium

The disk drive unit 816 includes a machine-readable medium 822 on which is stored one or more sets of instructions and data structures (e.g., software) 824 embodying or utilized by any one or more of the methodologies or functions described herein. The instructions 824 may also reside, completely or at least partially, within the main memory 804 and/or within the processor 802. during execution thereof by the computer system 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
    determining that one or more items have changed to a specified inventory status in an inventory database;
    responsive to the one or more items changing to the specified inventory status, storing the one or more items as items to be auctioned at a specified time;
    detecting a plurality of location-enabled client devices located within a predefined geographical area;
    transmitting electronic notifications to the plurality of location-enabled client devices located within a predefined geographical area, the electronic notifications indicating that an auction for the one or more items is to occur at the specified time; and
    in response to the specified time arriving, initiating the auction by transmitting instructions that cause a display of an auction user interface to the plurality of location-enabled client devices within the predefined geographical area, the auction user interface including an option to bid on the one or more items.

2. The method of claim 1, wherein each of the plurality of location-enabled client devices comprises a location sensor, and wherein the plurality of location-enabled client devices are detected using the location sensor.

3. The method of claim 1, wherein the specified inventory status is one or more of the following: low Quantity status or discontinued item status.

4. The method of claim 1, further comprising:
    executing a predetermined trigger to schedule the auction for the one or more items at the specified time the predetermined trigger configured for execution upon the specified inventory status of the one or more items in the inventory database being met.

5. The method of claim 1, wherein the auction user interface includes a display of a direction instruction that provides directions to a location of the one or more items with respect to a current location of respective devices of the plurality of location-enabled client devices.

6. The method of claim 1, wherein the electronic notifications include an option to register for the auction.

7. The method of claim 1, wherein the predefined geographical area is a physical place.

8. The method of claim 7, wherein the predefined geographical area includes a vicinity surrounding the physical place.

9. The method of claim 1, further comprising:
    providing a bid history interface that displays bids received to a user of a particular client device among the plurality of location-enabled client devices.

10. The method of claim 1, wherein the electronic notifications is implemented as one of: a mobile application notification, a Short Message Service (SMS) message, or a Multimedia Messaging Service (MMS) message.

11. The method of claim 1, further comprising:
    transmitting a confirmation to a client device of a winning auction participant, wherein the confirmation indicates a predetermined period of time during which the winning auction participant is to purchase the one or more items.

12. The method of claim 1, wherein the one or more items to be auctioned is one of a quantity of substantially identical items in the inventory database.

13. The method of claim 12, further comprising:
    determining a number of winning auction participants based on the quantity of substantially identical items to be auctioned and bids received.

14. A system comprising:
    one or more processors of a machine; and
    a memory storing instructions that, when executed by the one or more processors, cause the machine to perform operations comprising:
    determining that one or more items have changed to a specified inventory status in an inventory database;
    responsive to the one or more items changing to the specified inventory status, storing the one or more items as items to be auctioned at a specified time;
    detecting a plurality of location-enabled client devices located within a predefined geographical area;
    transmitting electronic notifications to the plurality of location-enabled client devices located within a predefined geographical area, the electronic notifications indicating that an auction for the one or more items is to occur at the specified time; and in response to the specified time arriving, initiating the auction by transmitting instructions that cause a display of an auction user interface to the plurality of location-enabled client devices within the predefined geographical area, the auction user interface including an option to bid on the one or more items.

15. The system of claim 14, wherein each of the plurality of location-enabled client devices comprises a location sensor, and wherein the plurality of location-enabled client devices are detected using the location sensor.

16. The system of claim 14, wherein the specified inventory status is one or more of the following: low quantity status or discontinued item status.

17. The system of claim 14, the operations further comprising:

executing a predetermined trigger to schedule the auction for the one or more items at the specified time the predetermined trigger configured for execution upon the specified inventory status of the one or more items in the inventory database being met.

18. The system of claim 14, wherein the auction user interface includes a display of a direction instruction that provides directions to a location of the one or more items with respect to a current location of respective devices of the plurality of location-enabled client devices.

19. A non-transitory machine-readable storage medium embodying instructions that, when executed by a machine, cause the machine to perform operations comprising:

determining that one or more items have changed to a specified inventory status in an inventory database;

responsive to the one or more items changing to the specified inventory status, storing the one or more items as items to be auctioned at a specified time;

detecting a plurality of location-enabled client devices located within a predefined geographical area;

transmitting electronic notifications to the plurality of location-enabled client devices located within a predefined geographical area, the electronic notifications indicating that an auction for the one or more items is to occur at the specified time; and in response to the specified time arriving, initiating the auction by transmitting instructions that cause a display of an auction interface to the plurality of location-enabled client devices within the predefined geographical area, the auction interface including an option to bid on the one or more items.

20. The machine-readable storage medium of claim 19, wherein each of the plurality of location-enabled client devices comprises a location sensor, and wherein the plurality of location-enabled client devices are detected using the location sensor.

* * * * *